United States Patent [19]

Fong et al.

[11] Patent Number: 4,829,121

[45] Date of Patent: May 9, 1989

[54] PROCESS FOR SULFOETHYLATION OF HIGH MOLECULAR WEIGHT ACRYLAMIDE CONTAINING POLYSOAP LATEX POLYMERS

[75] Inventors: Dodd W. Fong, Naperville; Ralph W. Kaesler, Barrington, both of Ill.

[73] Assignee: Nalco Chemical Company, Naperville, Ill.

[21] Appl. No.: 150,443

[22] Filed: Jan. 29, 1988

Related U.S. Application Data

[63] Continuation-in-part of Ser. No. 124,914, Nov. 24, 1987, abandoned.

[51] Int. Cl.$^4$ ............................................. C08L 39/00
[52] U.S. Cl. ................................ 524/555; 525/329.4; 525/351
[58] Field of Search ..................... 524/555; 525/329.4, 525/351

[56] References Cited

U.S. PATENT DOCUMENTS

| | | | |
|---|---|---|---|
| 3,979,348 | 9/1976 | Ballweber et al. | 524/512 |
| 4,090,992 | 5/1978 | Scanley | 524/555 |
| 4,339,371 | 7/1982 | Robinson et al. | 524/310 |
| 4,375,529 | 3/1983 | Fong et al. | 524/555 |
| 4,405,728 | 9/1983 | Krebs et al. | 524/555 |
| 4,419,483 | 12/1983 | Yanutola | 524/555 |
| 4,440,652 | 4/1984 | Hunter | 525/329.4 |
| 4,680,339 | 7/1987 | Fong | 525/351 |
| 4,703,092 | 10/1987 | Fong | 525/329.4 |

*Primary Examiner*—Joseph L. Schofer
*Assistant Examiner*—J. M. Reddick
*Attorney, Agent, or Firm*—Donald A. Peterson; William J. Birmingham

[57] ABSTRACT

Improved methods of sulfoethylation of high molecular weight polysoap acrylamide containing polymers to produce sulfoethylated acrylamide polymers in water-in-oil latex form having reduced specific viscosities (RSV's) above about 18.

9 Claims, No Drawings

PROCESS FOR SULFOETHYLATION OF HIGH MOLECULAR WEIGHT ACRYLAMIDE CONTAINING POLYSOAP LATEX POLYMERS

This application is a continuation-in-part of application Ser. No. 124,914 filed Nov. 24, 1987 now abandoned.

FIELD OF INVENTION

This invention relates to improved methods of sulfoethylation of high molecular weight acrylamide containing polymers and more particularly to sulfoethylation methods which result in sulfoethylated acrylamide containing polymers in water-in-oil latex form which have reduced specific viscosities (RSV) greater than the acrylamide polymer used as the starting material polymer in the process and above about 18.

BACKGROUND OF THE INVENTION

Brief Description of the Prior Art

U.S. Pat. No. 4,339,371 (July 13, 1982) describes polysoap latices of acrylamide polymers of the type used as starting materials in the methods and processes of the present invention.

U.S. Pat. No. 3,979,348 (Sep. 7, 1976) describes the sulfomethylation of polyacrylamide polymers in latex form.

Scanley, U.S. Pat. No. 4,090,992 (1978) describes sulfomethylation of polyacrylamide (PAM) latex (water-in-oil) using bisulfite and formaldehyde by a procedure which requires drying of the water-in-oil (PAM) latex to reduce the water content to less than 40% (based on polymer and water) and conducting the sulfoethylation at temperatures of 50°–55° C.

Similarly the application of D. W. Fong, now U.S. Pat. No. 4,703,092 describes the sulfoethylation of low molecular weight polyacrylamide or similar polymers especially in solution or in solutions dispersed as water-in-oil emulsions which polymers contain pendant amide groups derived from acrylamide methylacrylamide and ethyl acrylamide (PAA and PAM) with the chemical reactants in the equivalent of a transamidation reaction. The chemical reactants include inter alia, taurine or salts thereof.

SUMMARY OF THE INVENTION

It is one of the objects of the present invention to provide a method of introducing sulfonate groups into polymers and more particularly the provision of methods or processes for the sulfoethylation of water-in-oil, polysoap latices of acrylamide containing polymers of high molecular weight, such as those described in U.S. Pat. No. 4,339,371, to produce a water-in-oil latex of a sulfoethylated acrylamide containing polymers which have reduced specific viscosities (RSV's) which are greater than the RSV of the original polymer, and particularly at least about 18 to 20 or above. The term Reduced Specific Viscosity or RSV as used herein is the specific viscosity divided by concentration, particularly as measured at concentrations of 0.045 grams of polymer in a one normal solution of sodium nitrate.

A further object is the provision of a method of sulfoethylation high molecular weight polysoap water-in-oil latices of polyacrylamide (PAM) or other acrylamide containing copolymers to produce polymers which contain acrylamide, acrylate and sulfoethylacrylamide mer units and which polymer latices have RSV's greater than 18, preferably greater than 20.

The use of polysoap lattices permits the sulfoethylation of high molecular weight polymers.

The sulfoethylated acrylamide containing polymers of the present invention are flocculants or thickeners useful in sludge dewatering operations, in paper manufacture, in mining and mineral processing operations and in drilling mud formulations.

Accordingly, the fulfillment of these and other objects of the present invention are provided by an improved method of sulfoethylation of a polysoap acrylamide polymer latices which comprises reacting of a polysoap, water-in-oil, latex of an acrylamide containing polymer, with taurine or a salt thereof, wherein the percentage weight of water to the aggregate weight of polymer and water in the reaction mixture is between about 45 to 90%, at elevated pressures and at temperatures above about 120° C. to produce a water-in-oil latex of sulfoethylated acrylamide polymer containing mer units of acrylamide, acrylate and sulfoethyl substituted acrylamide and that has a reduced specific viscosity greater than the reduced specific viscosity of the latex starting material and preferably an RSV above about 18, and most preferably 20. The polymer used as starting material has a high molecular weight at least above about 1,000,000, preferably two (2) million to fifteen (15) million or more, up to 25 million. RSV's of about 22 correspond to molecular weights of about 10 million.

DETAILED DESCRIPTION OF THE INVENTION

The process of the present invention comprises the sulfoethylation of polysoap latices of acrylamide containing polymers including polyacrylamides (PAM) and copolymers of acrylamide and acrylic acid (PAA) by reacting a water-in-oil polysoap latex of acrylamide containing polymer with taurine or sodium taurate wherein the percentage weight of water to the aggregate weight of water and polymer is between 45 and 90%, at elevated temperatures above 120° C. and superatmospheric pressures and for a time sufficient to sulfoethylate said polymer and produce a latex polymer containing sulfoethylacrylamide, acrylate and acrylamide mer units and having a reduced specific viscosity greater than the original PAM, and preferably an RSV above about 18 to 20.

The starting aqueous phase of the latex reaction mixture has, as indicated above, a water to water and polymer solids content ratio of from 45 to about 90%. Preferably the percentage of water is from 50% to 70%.

The sulfoethylation process of the present invention is carried out in latex. In the most preferred form the process is carried out in the aqueous phase of a water-in-oil emulsion which is stable at temperatures of up to 160° C. and above. In this procedure using polysoap lattices a high molecular weight polymer starting material may be used in contrast to solution polymerizations wherein high molecular weights exceeding above one million in about 10% solution result in thickened gels which are very difficult to process. In the preferred form of the instant process the water phase of the polysoap latex of an acrylamide containing polymer in water-in-oil emulsion form is reacted with taurine or sodium taurate as hereinafter described to produce sulfoethylated acrylamide containing polymers as water-in-oil latices which have an RSV of at least 18. The so-called oil phase of the emulsion is preferably a water immiscible organic solvent, preferably a Low Odor Paraffinic Solvent (LOPS) having minimal odor. The water-in-oil latex of the polysoap PAM or PAA used as a starting material is prepared using a surfactant or mixture of surfactants, preferably include a polysoap surfactant, which may be exemplified by Rapisol B-246, PA-18.

Rapisol B-246 is an ABA block copolymer where A=12-hydroxystearate (MW@1500) and B=polyethylene oxide (MW@1500) with a hydrophylic-hydrophobic balance (HLB) of 5-6. P-18 is a 1:1 copolymer of 1-octadecene and maleic anhydride with a molecular weight of about 50,000 and sold by Gulf Chemical Co.

The polyacrylamide containing polymers PAM and PAA starting material is preferably a water-in-oil latex where the polymer that has a molecular weight (Mw) of at least 1 million, preferably from 2 million to 15 million or more, up to as high as 25 million. Polymers with RSV's in the order of 22 have a molecular weight of about 10 million.

The improved sulfoethylation process of this invention is carried out by batch procedures wherein all the ingredients and reactants are included in the aqueous batch reaction mixture at the outset of the reaction.

In the present process a water-in-oil polysoap latex of PAM or PAA is adjusted to have a water content of at least 45% aqueous which the taurine or sodium taurate reactant is added. The taurine or sodium taurate sulfoethylating agent or reactant is used in amounts up to 50 mol percent (%) or more based on the total mer unit content of the polymer. The sulfoethylation process may be carried out using taurine (2-aminoethanesulfonic acid or $NH_2C_2H_4-SO_3H$) or an ammonium, amine, alkali metal or alkaline earth metal salt thereof such as for example sodium taurate. The reaction mixture in a preferred form also contains added low odor paraffinic solvent (LOPS) and added surfactants such as Span 80 (Sorbitan monostearate), or preferably a polysoap surfactant such as P-18, a 1:1 copolymer of 1-octadecene and maleic anhydride, sold by Gulf Chemicals Co. or other polysoap surfactants which produce latices stable up to 160° C. Another preferred polysoap surfactant is Rapisol B-246 an ABA block copolymer wherein A=12-hydroxy stearate (molecular wt. @1500) and B=polyethylene oxide (molecular wt. @1500) with an HLB (hydrophilic-lipophilic balance) of 5-6, manufactured by ICI America.

The water-in-oil polysoap latex of PAM or PAA used in a starting material is a polysoap stabilized water-in-oil latex emulsion in which the oil or solvent phase is a paraffinic solvent such as LOPS (Low Odor Paraffinic solvent). The starting PAM or PAA lattices used as starting materials may have RSV's from 5 and above and preferably from 18 to 50.

The sulfoethylation process of the invention is carried out at a temperature of at least 120° C. up to about 180° C. for a time period of about 30 minutes to 6 hours or more. Preferred temperatures ranges are from about 130° C. to 160° C. A preferred reaction time ranges from 1 to 6 hours.

Another embodiment of this invention can be carried out in the presence of varying amounts of NaOH or HCl which in turn controls the amount of carboxylate formation. The taurine or taurate is used at least up to 80 mol percent based on acrylamide. Because the temperatures of the reaction exceeds 100° C., the process is carried out in a closed reactor under superatmospheric pressure. One convenient reactor is a Paar bomb.

It has been found that the sulfoethylation process of the present invention is carried out in latex reaction mixtures. More particularly, it has been determined that sulfoethylation reactions using taurine or sodium taurate as a sulfoethylation agent for solutions of high molecular weight polymers rather than in a latex form is not successful resulting in partial degradation and giving rise to polymers and terpolymers with RSV's lower than the RSV of the starting acrylamide polymer. These procedures and the undesirable results are illustrated in the following Example A and Table I following.

EXAMPLE A

| Reagents: | |
|---|---|
| PAM (Polyacrylamide; 28.2% of polymer RSV 22) | 9.00 g. |
| Taurine (40 mol %) | 1.78 g. |
| Water | 204.90 g. |
| Ethoxy (9)-nonyl phenol | 0.30 g. |

The PAM used was initially in latex form but inverted into a total of 150 g. in water solution. The taurine was dissolved in a portion of the water and added with other material to the PAM solution and stirred for 20 minutes in a Paar bomb reactor. The contents were purged with nitrogen gas for 15-20 minutes. The reactor was then sealed and heated to a predetermined temperature for varying periods of time. The results are shown in the following Table 1.

TABLE I

SOLUTION REACTIONS[1] OF HIGH MW PAM[2]

| EXAMPLE | REAGENT (MOL %) | TEMP °C. | HOURS | PRODUCT $SO_3^{3-}$/COO—/$CONH_2$ MOL % | RSV |
|---|---|---|---|---|---|
| A-1 | 40-Taurine | 130 | 1 | 5.1/10.1/84.8 | 16.3 |
| A-2 | 40-Taurine | 130 | 2 | 12.3/11.8/75.9 | 11.7 |
| A-3 | 40-Taurine | 150 | 0.5 | 15.6/14.8/69.6 | 19.0 |
| A-4 | 40-Taurine | 150 | 1 | 19.6/28.3/52.1 | 12.9 |
| A-5 | 40-Taurine | 150 | 1.5 | 17.7/45.7/36.6 | 9.0 |

[1]wt % polymer solution (water)
[2]RSV = 22
[3]Terpolymer composition consisting of incorporated taurine ($SO_3-$), acrylate, and acrylamide units

DESCRIPTION OF THE PREFERRED EMBODIMENTS

The following examples illustrate methods of carrying out the sulfoethylation of acrylamide containing polysoap latex polymers in accordance with the process of the present invention.

In all of these examples the starting PAM or PAA latex is a water-in-oil polysoap latex having an RSV of about 22-24.

Examples 1-9 represent sulfoethylation procedures involving sulfoethylation of a PAM water-in-oil polysoap latex and Example 10 relates to a PAA polysoap latex starting material. As may be seen the examples and the following Table II, such processes result in water-in-oil latex polymers which have RSV's greater than the original latex and all above 20.

EXAMPLE I

| Reactants | |
|---|---|
| PAM Latex (A polysoap latex | 150.00 g |

-continued

| Reactants | |
|---|---|
| containing 30.3% polymer and 42.0% water; RSV = 22–24) | |
| Taurine | 8.00 g |
| NaOH (50% solution) | 5.10 g |
| Water | 1.5 g |
| C. Low Odor Paraffinic Solvent (LOPS) | 14.00 g |
| Surfactant (Span 80; sorbitan monoleate) | 7.00 g |
| Total | 185.6 g |

Procedure:

The reactants including surfactant, water, taurine and NaOH were added and mixed in an open pressure reactor vessel (a Paar bomb) for 30 minutes. The reactor vessel was then closed and the batch reaction mixture heated at 145° C. for 3 hours. The reactor and contents were cooled and the latex removed. The resulting sulfoethylated PAM polysoap latex was analyzed for acrylate, acrylamide and sulfoethyl substituted acrylamide, functional mer groups.

Table II following, sets out the reactants for this and other examples, the mol % of taurine or other reactants and conditions used (time and temperature), the mole % ratio of functional groups in the sulfoethylated PAM latex polymer and the RSV of the resulting latex.

EXAMPLE 2

| Reactants | |
|---|---|
| A. PAM Latex (Polysoap Latex 30.3% polymer and 42.0% water surfactant; RSV = 22–24.) | 150.00 g |
| B. Taurine | 8.00 g |
| Water | 6.15 g |
| C. Low Odor Paraffinic Solvents (LOPS) | 14.00 g |
| Surfactant (Span 80; sorbitan) | 7.00 g |
| Total | 185.55 g |

Procedure:

Taurine and water were added as a slurry to the polyacrylamide (PAM) polysoap water-in-oil latex, in an open Paar bomb reaction vessel and stirred. The resulting mixture purged with nitrogen gas or 30 minutes. The reaction vessel was then closed and heated at 161°–162° C. for 2 hours. The reaction vessel and contents were cooled and the latex removed. The latex was analyzed for mer units and RSV. The conditions of the process and the results are set forth in Table II following. The RSV was 35.8.

EXAMPLE 3

| Reactants | |
|---|---|
| A. PAM Latex (Polysoap Latex 30.3% polymer and 42.0% water RSV = 22). | 150.00 g |
| B. Taurine (10 mol %) | 8.00 g |
| Water | 6.55 g |
| C. Low Odor Paraffinic Solvents (LOPS) | 14.00 g |
| Surfactant (Span 80; sorbitan) | 7.00 g |
| Total | 185.55 g |

Procedure:

Taurine, water and sodium hydroxide were added as a slurry to be added to the polyacrylamide polysoap water-in-oil latex, PAM in a Paar bomb reaction vessel and stirred. The resulting mixture purged with nitrogen gas or 30 minutes. The reaction vessel was then closed and heated at 158° C. for 1 hour. The reaction vessel and contents were cooled and the latex removed. The latex was analyzed for mer units and RSV. The conditions of the process and the results are set forth in Table II following. The RSV was 36.8.

EXAMPLE 4

| Reactants | |
|---|---|
| PAM Polysoap Latex; RSV = 22 (same as Ex. 1) | 150.00 g |
| Taurine | 8.0 g |
| NaOH (50 wt. % solution) | 7.05 g |
| Water | 2.00 g |
| Low Odor Paraffinic Solvents (LOPS) | 14.00 g |
| Surfactant (Span 80) | 7.00 g |
| Total | 188.65 g |

Procedure:

The reactants including surfactant, water, taurine and NaOH were added and mixed in an open pressure reactor vessel (a Paar bomb) for 30 minutes. The reactor vessel was then closed and the batch reaction mixture heated at 156° C. for 3 hrs. The reactor and contents were cooled and the latex removed. The resulting sulfoethylated PAM polysoap latex was analyzed for acrylate, acrylamide and sulfoethyl substituted acrylamide, functional mer groups and RSV was shown in Table I following.

EXAMPLE 5

| Reactants: | |
|---|---|
| PAM Polysoap Latex (See Ex. 1) | 150.00 g |
| Taurine | 8.00 g |
| Hydrochloric Acid (HCl 37.8 wt. % solution) | 0.42 g |
| Low Odor Paraffinic Solvent (LOPS) | 14.00 g |
| Surfactant (Span 80) | 7.00 g |
| Total | 186.82 |

Procedure:

The reactants including PAM latex, surfactant, LOPS water, taurine and hydrochloric acid were mixed in an open pressure reactor vessel (a Paar bomb) for 30 minutes. The reactor vessel was then closed and the batch reaction mixture heated at 156° C. for 3 hrs. The reactor and contents were cooled and the latex removed. The resulting sulfoethylated PAM polysoap latex was analyzed for acrylate, acrylamide and sulfoethyl substituted acrylamide, functional mer groups and RSV as shown in Table II following.

EXAMPLE 6

| Reactants | |
|---|---|
| PAM Polysoap Latex; RSV = 22 (See Ex. 1) | 150.00 g |
| Taurine | 16.00 g |
| NaOH (50 wt. % solution) | 10.2 g |
| Water | 1.4 g |
| Low Odor Paraffinic Solvents (LOPS) | 14.00 g |
| Surfactant (Span 80; sorbitan monoleate) | 7.00 g |
| Total | 198.6 |

Procedure:

The reactants including LOPS and surfactant were added to the latex and water, taurine and NaOH were added to the mixture and further mixed in an open pressure reactor vessel (a Paar bomb) for 30 minutes. The reactor vessel was then closed and the batch reaction mixture heated at 161° C. for 1 hr. The reactor and contents were cooled and the latex removed. The resulting sulfoethylated PAM polysoap latex was analyzed for acrylate, acrylamide and sulfoethyl substituted acrylamide, functional mer groups. and RSV as shown in Table II following.

EXAMPLE 7

| Reactants: | |
|---|---|
| PAM Polysoap Latex (See Ex. 1) | 150.00 g |
| Taurine | 20.00 g |
| Water | 16.40 g |
| Low Odor Paraffinic Solvents (LOPS) | 14.00 g |
| Surfactant (Span 80) | 7.00 g |
| Total | 207.4 g |

Procedure:

The reactants including surfactant, water, taurine and NaOH were added to the PAM latex and stirred in an open pressure reactor vessel (a Paar bomb) for 30 minutes. The reactor vessel was purged with nitrogen then closed and the batch reaction mixture heated at 161° C. for 2.5 hrs. The reactor and contents were cooled and the latex removed. The resulting sulfoethylated PAM polysoap latex was analyzed for acrylate, acrylamide and sulfoethyl substituted acrylamide, functional mer groups and RSV shown in Table II following.

EXAMPLE 8

| Reactants: | |
|---|---|
| A. PAM Polysoap Latex RSV @ 22 (See Ex. 1) | 100.00 g |
| B. Taurine | 21.43 |
| Water | 42.86 g |
| C. Low Odor Paraffinic Solvents (LOPS) | 50.00 g |
| Surfactant (Span 80) | 1.79 |
| B-246 | 0.59 g |
| PA-18 | 0.59 g |
| Brij-92 | 7.00 g |
| Total: | 224.26 g |

Procedure:

Reactant B was dissolved in water in an open reactor with warming, filtered to remove undissolved solids and added to latex reagent (A) followed by stirring for 30 minutes. Reactant C was then added to the mixture and purged with nitrogen gas for 30 minutes. The reaction vessel was then closed and heated at 161° C. for 3 hours. The reaction vessel and contents were cooled and the resulting latex removed. The latex was tested to determine its RSV and analyzed for functional mer units. The conditions of the process and results are set forth in Table II following.

EXAMPLE 9

| Reactants: | |
|---|---|
| A. PAM Polysoap Latex, RSV = 22 (See Ex. 1) | 50.00 g |
| B. Taurine | 21.40 g |
| Water (H2O) | 63.70 g |
| C. Low Odor Paraffinic Solvents (LOPS) | 100.00 g |
| Surfactant (Span 80) | 2.45 g |
| B246 | 0.80 g |
| PA 18 | 0.80 g |
| Brij 92 | 6.50 g |
| Total: | 245.65 g |

Procedure:

Reactant (C) was added to latex (A) followed by (B) in an open reactor followed by stirring for 30 minutes. The mixture was purged with nitrogen gas for 30 minutes. The reaction vessel was then closed and heated at 162° C. for 6 hours. The reaction vessel and contents were cooled and the latex was removed. The latex was tested to determine its RSV and analyzed for functional mer units. The conditions of the process and the results are set forth in Table II following.

EXAMPLE 10

| Reactants: | |
|---|---|
| PAM Polysoap latex; RSV = 22 (See Ex. 1) | 150.00 g |
| Taurine | 9.22 g |
| Water | 1.70 g |
| NaOH | 5.90 g |
| Low Odor Paraffinic Solvent | 14.00 g |
| Surfactant (Span 80) | 7.00 g |
| Total | 187.82 g |

Procedure:

The reactants including latex, surfactant, water, taurine and NaOH were added and mixed in an open pressure reactor vessel (a Paar bomb) for 30 minutes. The reactor vessel was then closed and the batch reaction mixture heated at 160° C. for 2.25 hrs. The reactor and contents were cooled and the latex removed. The resulting sulfoethylated PAM polysoap latex was analyzed for acrylate, acrylamide and sulfoethyl substituted acrylamide, functional mer groups and RSV as shown in Table II following.

TABLE II

| EXAMPLE | STARTING POLYMER | TAURINE (MOL %) | OTHER REAGENTS (MOL %) | WATER WT %[3] | TEMP °C. | HOURS | PRODUCT $SO_3^-/COO^-/CONH_2$[4] (MOL %) | RSV | WT % |
|---|---|---|---|---|---|---|---|---|---|
| 1 | PAM[1] | 10 | 10-NaOH | 59.6 | 145 | 3 | 10.0/36.1/53.9 | 47.5 | 28.3 |
| 2 | PAM | 10 | — | 60.5 | 156 | 2 | 5.8/15.9/78.3 | 35.8 | 26.7 |
| 3 | PAM | 10 | — | 60.5 | 156 | 3 | 9.0/23.7/67.4 | 36.8 | 27.9 |
| 4 | PAM | 10 | 15-NaOH | 60.2 | 156 | 2 | 9.0/40.2/50.8 | 39.5 | 27.5 |
| 5 | PAM | 10 | 0.7-HCl | 60.9 | 156 | 3 | 8.9/19.5/71.6 | 33.5 | 27.7 |
| 6 | PAM | 20 | 20-NaOH | 60.5 | 161 | 1 | 17.8/30.1/52.1 | 45.6 | 29.2 |
| 7 | PAM | 25 | — | 63.6 | 161 | 2.5 | 17.4/16.0/66.6 | 37.1 | 27.8 |
| 8 | PAM | 40 | — | 73.7 | 161 | 3 | 25.8/25.9/48.3 | 35.5 | 18.9 |
| 9 | PAM | 80 | — | 84.8 | 162 | 6 | 41.5/13.4/45.1 | 35.4 | 10.1 |

TABLE II-continued

| EXAMPLE | STARTING POLYMER | TAURINE (MOL %) | REAGENTS (MOL %) | OTHER WATER WT %[3] | TEMP °C. | HOURS | PRODUCT SO$_3^-$/COO$^-$/CONH$_2$[4] (MOL %) | RSV | WT % |
|---|---|---|---|---|---|---|---|---|---|
| 10 | PAA/AM[2] | 10 | 10-NaOH | 55.7 | 160 | 2.25 | 9.2/53.5/37.3 | 25 | 31.9 |

[1] Polysoap latex, RSV = 21–24, 30.3 wt % polymer, 42 wt % water based on polymer and water
[2] 30 mol % acrylate, 35 wt % polymer
[3] Based on initial polymer and water in total latex mixture, i.e. wt water/wt water + wt polymer
[4] Terpolymer composition consisting of incorporated taurine (SO$_3^-$), acrylate (COO$^-$), and acrylamide (CONH$_2$) units From Table II it is apparent that greatly improved RSV's can be obtained by the method of the invention described herein.

Thus the Examples demonstrate that the use of taurine and high water levels of 50 to 90% results in latex polymers which have RSV's higher than the starting material PAM latex.

Example 10 illustrates the applicability of the process to polyacrylamide acrylic and copolymer latexes.

We claim:

1. An improved process for sulfoethylation of acrylamide containing polysoap polymer latices to produce stable sulfoethylated latex polymers with a Reduced Specific Viscosity (RSV) greater than the starting polymers which comprises reacting a polysoap water-in-oil latex of an acrylamide containing polymer having a molecular weight of from about one million to about 25 million with taurine or its salts at an elevated superatmospheric pressure and at temperatures above about 120° C. in a reaction mixture containing from about 45 to 90% water for a period of from about 0.5 to about 6 hours, the resulting polymer having an RSV of at least 18.

2. A process according to claim 1 wherein the taurine salts used include alkali metal, alkaline earth metal, ammonium and amine salts of taurine.

3. A process according to claim 2 wherein the taurine salt is sodium taurate.

4. A process according to claim 1 wherein the RSV of the final polymer is 20 or above.

5. A process according to claim 1 wherein the reaction temperature is from about 120° to 180° C.

6. A process according to claim 1 wherein the acrylamide containing polymer latex reactant starting material is a copolymer of acrylamide and acrylic acid.

7. A process according to claim 1 wherein the acrylamide containing latex polymer reactant starting material has a molecular weight of from about 2 to 15 million.

8. A process according to claim 1 wherein the acrylamide containing polymer latex reactant is a copolymer of acrylamide and methacrylic acid.

9. A process according to claim 1 wherein taurine or its salts is employed in amounts of up to 50 mol % based on the total mer units content of the polymer.

* * * * *